United States Patent [19]

Watanabe

[11] 4,061,343
[45] Dec. 6, 1977

[54] VIBRATION TRANSMISSION MECHANISM FOR A PHONOGRAPH

[75] Inventor: Katsumi Watanabe, Kawasaki, Japan

[73] Assignee: Yugen Kaisha Watanabe Kenkyusho, Japan

[21] Appl. No.: 696,113

[22] Filed: June 15, 1976

[30] Foreign Application Priority Data

Mar. 11, 1975 Japan .................................. 50-26566

[51] Int. Cl.² .............................................. G11B 3/00
[52] U.S. Cl. ................................ 274/24 R; 274/1 A; 274/25
[58] Field of Search ................ 274/1 A, 24 R, 34, 26, 274/25, 27, 29, 9 R

[56] References Cited

U.S. PATENT DOCUMENTS

| 1,020,485 | 3/1912 | Edison | 274/34 |
| 1,215,410 | 2/1917 | Repp | 274/26 |
| 1,260,790 | 3/1918 | Nystrom | 274/26 |
| 1,408,514 | 3/1922 | Johnson | 274/27 |
| 2,541,163 | 2/1951 | Hornbostel | 274/34 |
| 3,589,735 | 6/1971 | Watanabe | 274/1 A |
| 3,721,449 | 3/1973 | Sirinek | 274/1 A |

FOREIGN PATENT DOCUMENTS

| 456,935 | 9/1913 | France | 274/26 |

*Primary Examiner*—Richard E. Aegerter
*Attorney, Agent, or Firm*—Irving M. Weiner; Pamela S. Austin

[57] ABSTRACT

In a phonograph of the type wherein, during playback, a pickup arm travels in sliding contact with an overlying intermediate vibrator for transmission of stylus vibrations thereto, a lever is fulcrumed at its intermediate point on the intermediate vibrator. A constant force is applied to one end of the lever, as by a spring, and the other lever end is urged against a loudspeaker diaphragm rigidly supported by the phonograph casing, so that the vibrations of the intermediate vibrator are transmitted via the lever to the diaphragm to cause same to produce corresponding sound waves. Preferably, the distance between the said other end and fulcrum of the lever is at least equal to the distance between the said one end and fulcrum of the lever.

4 Claims, 2 Drawing Figures

VIBRATION TRANSMISSION MECHANISM FOR A PHONOGRAPH

BACKGROUND OF THE INVENTION

1. Field of the Invention

My invention relates to simplified sound reproducing apparatus, and more specifically to a phonograph of the type wherein the mechanical vibrations set up in a reproducing stylus by the undulations in a record groove are transmitted, without the process of electrical amplification, to a loudspeaker diaphragm to cause same to produce audible vibrations of the air. Even more specifically, my invention is directed to an improved vibration transmission mechanism in such a phonograph.

2. Description of the Prior Art

According to an example of known phonographs of the above specified type, an intermediate vibrator plate or arm is arranged between a pickup arm and loudspeaker cone or diaphragm, so that the pickup arm travels in sliding contact with the intermediate vibrator during playback for transmission therethrough of stylus vibrations to the diaphragm, as disclosed for example in my U.S. Pat. Nos. 3,589,735 and 3,773,331. The diaphragm can be either directly mounted on the intermediate vibrator as in the mentioned U.S. patents or, supported as by the phonograph casing, suitably mechanically connected to the intermediate vibrator.

The quality of the sound reproduced by phonographs of such known construction has usually been so poor that they have mostly found use only as playthings for children, either by themselves or by being installed in dolls or the like. The poor sound quality of the phonographs has been more or less taken for granted in such applications. Recently, however, the phonographs have found their way into more sophisticated toys or other devices of educational character. Particularly in this latter application the sound quality of the phonographs stands in need of improvement as far as feasible.

The poor or disagreeable sound quality of the phonographs of the class in question is largely attributable to the fact that the diaphragm in use tends to emphasize high frequency vibrations transmitted thereto, resulting in the production of harshly high-pitched sound. A measure should therefore be taken to limit or reduce the response of the diaphragm to treble frequency vibrations.

I have found that, in the known phonograph construction described previously, the above objective can be accomplished only when the diaphragm is supported by the casing or some other stationary part of the phonograph and connected to the intermediate vibrator via means which limit the transmission of treble frequency vibrations to the diaphragm.

Another problem arises when the diaphragm is supported by such stationary part and mechanically connected to the intermediate vibrator. Since the surface of the record disc or of the turntable used in the phonographs of this class is usually not exactly planar, the reproducing stylus and therefore the intermediate vibrator suffer some slight displacement toward and away from the diaphragm during playback. Further, the diaphragm itself may be displaced toward the intermediate vibrator as a result of some external force applied to the phonograph casing during use. The mechanical connection between the diaphragm and intermediate vibrator must therefore be capable of absorbing such relative displacement thereof toward and away from each other.

SUMMARY OF THE INVENTION

It is an object of this invention to provide an improved vibration transmission mechanism for a phonograph of the type having an intermediate vibrator arranged between pickup arm and diaphragm, such that the noted problems of the prior art are thoroughly overcome.

Another object of the invention is to provide a vibration transmission mechanism which enables the phonograph to reproduce sound of more aggreeable tone than currently available phonographs of like class and kind.

A further object of the invention is to provide a vibration transmission mechanism capable of protecting the diaphragm, reproducing stylus, record and other related parts of the phonograph against damage or deformation due to possible relative displacement of the diaphragm and record toward each other.

In accordance with this invention there is provided, in a phonograph of the type defined, the improvement comprising a lever pivotally supported at its intermediate point on an intermediate vibrator and having one end disposed opposite to a diaphragm supported by a casing or like stationary part of the phonograph. A constant force is applied, as by a spring, on the other end of the lever for urging the said one end thereof against the diaphragm.

Thus, as a pickup arm carrying a reproducing stylus travels in sliding contact with the intermediate vibrator during playback the mechanical vibrations imparted to the stylus by the groove undulations of a rotating record on a turntable are transmitted to the diaphragm via the pickup arm, intermediate vibrator and lever. By suitably selecting the magnitude of the force applied to the said other end of the lever and the ratio of the lever arms, the force urging the said one lever end against the diaphragm can be made so small as to effectively limit or reduce the diaphragm response to mechanical vibrations of treble frequencies, in order that the sound reproduced may be of pleasing tone. The lever is of course also effective to absorb any accidental relative displacement of the diaphragm and intermediate vibrator toward each other.

According to a further feature of this invention, the force applied to the said other end of the lever combines with a reactive force exerted on the said one lever end by the diaphragm to provide desired pressure under which the stylus is urged against the record on the turntable. By suitable selection of the ratio of the lever arms, the stylus pressure can be made sufficiently in excess of the force urging the said one lever end against the diaphragm.

The above and various other objects, features and advantages of this invention and the manner of attaining them will become more apparent, and the invention itself will best be understood, upon consideration of the following detailed description taken in connection with the accompanying drawings showing a specific embodiment of the invention.

DETAILED DESCRIPTION

Figure 1:
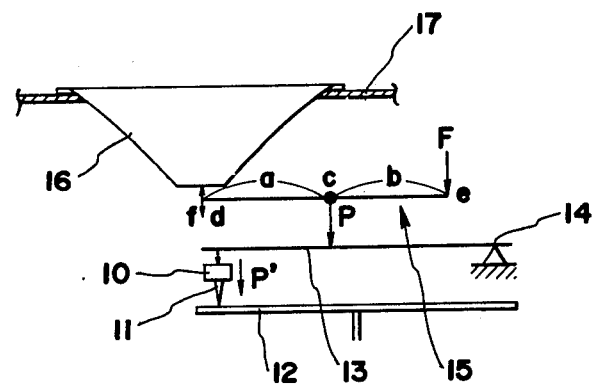
FIG. 1 is a schematic illustration explanatory of the operating principles of the vibration transmission mechanism for a phonograph in accordance with this invention.

The principles of the vibration transmission mechanism for a phonograph according to the invention will first be explained in detail with reference to FIG. 1 of the accompanying drawings. There is shown at 10 a pivotally mounted pickup arm carrying at its free end a reproducing stylus 11 which rides in a spiral groove in a disclike phonograph record 12 mounted on a turntable which is not shown in FIG. 1. Arranged over the pickup arm 10 is an intermediate vibrator 13 which is pivotally supported in a cantilever fashion by mounting means at 14 on some stationary part of the phonograph and with which the pickup arm travels in sliding contact as the stylus 11 follows the record groove during rotation of the turntable.

A lever 15 is fulcrumed at its intermediate point $c$ on the intermediate vibrator 13. One end $d$ of this lever is disposed under a diaphragm 16 which is rigidly supported by a phonograph casing 17 and which constitutes the loudspeaker of the phonograph.

If a force F is applied to the lever 15 at its end $e$, as by means of a spring, the other lever end $d$ will apply a force $f$ to the diaphragm 16. Since this diaphragm is rigidly supported by the phonograph casing 17 as aforesaid, a reactive force $f$ of equal magnitude is exerted on the lever end $d$.

According to the well known principle of the lever, the moments of the forces F and $f$ must counterbalance each other to maintain equilibrium, so that $$a \times f = b \times F \quad (1)$$

where $a$ is the distance between fulcrum $c$ and lever end $d$, or the lever arm of the load, and $b$ is the distance between fulcrum $c$ and lever end $e$, or the lever arm of the applied force.

In the arrangement of FIG. 1, the fulcrum $c$ of the lever 15 applies to the intermediate vibrator 13 a force P which is a sum of the forces F and $f$.

$$P = F + f \quad (2)$$

Combining Equations (1) and (2), the force $f$ applied to the diaphragm 16 by the lever 15 can be defined as $$f = \frac{b}{a+b} P. \quad (3)$$

By transposing Equation (1), the force $f$ can also be given by $$f = b/a\, F. \quad (4)$$

It will be noted from FIG. 1 that the stylus 11 is urged against the record 12 under pressure P′ exerted on the pickup arm 10 from the intermediate vibrator 13. This pressure P′, which is hereinafter referred to as the stylus pressure, can be considered approximately equal to the force P applied to the intermediate vibrator 13 by the lever 15, provided that the supporting point 14 of the intermediate vibrator is sufficiently distanced from the lever fulcrum $c$ and the pickup arm 10.

As will be evident from Equation (3), the lever force $f$ applied to the diaphragm 16 is less than the stylus pressure P′ regardless of the ratio of the lever arm $a$ to $b$. Equation (4) clearly indicates, however, that if the lever arm $a$ is shorter than the lever arm $b$, the lever force $f$ applied to the diaphragm 16 is greater than the force F applied to the lever 15. Preferably, therefore, the lever arm $a$ should be greater than, or at least equal to, the lever arm $b$.

When the lever arms $a$ and $b$ are equal, the lever force $f$ applied to the diaphragm 16 is of course equal to the force F applied to the lever 15 and to approximately one-half of the stylus pressure P′. The closer the fulcrum $c$ is to the lever end $e$, the less will be the lever force $f$ applied to the diaphragm 16 by any given force F exerted on the lever 15.

If the lever force $f$ applied to the diaphragm 16 is made suitably small, the diaphragm has a limited or reduced response to the mechanical vibrations of a high frequency range that are transmitted from the record 12 by way of stylus 11, the pickup arm 10, the intermediate vibrator 13, and the lever 15. Advantageously, according to this invention, the lever force $f$ applied to the diaphragm 16 can be easily reduced to a desired degree without unduly decreasing the stylus pressure P′. The phonograph constructed in accordance with the principles of this invention will therefore reproduce sound of agreeable tone.

Figure 2:
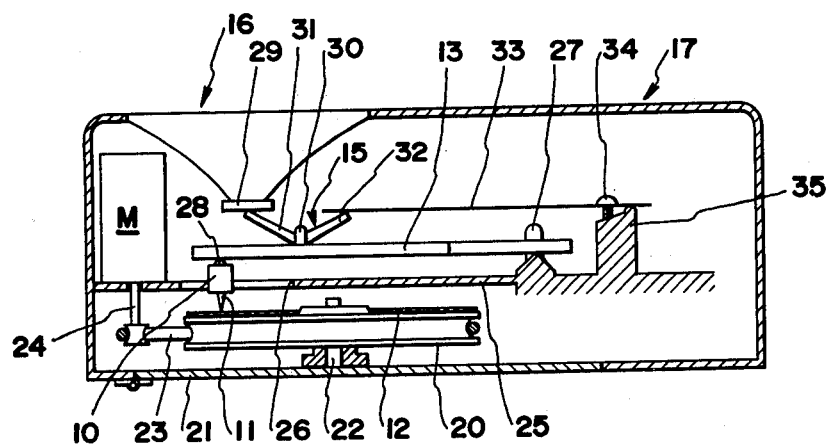
FIG. 2 is a vertical sectional view of a phonograph incorporating the vibration transmission mechanism of the invention, the view showing, partly in side elevation and partly in section, some essential parts of the phonograph arranged within its casing.

FIG. 2 illustrates a practical form of the vibration transmission mechanism according to the invention as incorporated in a phonograph having a motor driven turntable shown at 20. The illustrated phonograph includes the casing 17 having a hinged openable bottom 21 on which there is uprighly mounted a spindle or shaft 22 rotatably supporting the turntable 20. The disclike phonograph record 12 is mounted on the turntable 20 and centered about the spindle 22. An endless belt 23 extends around the output shaft 24 of the an electric drive motor M and the turntable 20 to transmit the rotation of the former to the latter. The drive motor M can be powered as by a battery, not shown, that is accommodated within the casing 17.

Within the casing 17 a platform 25 is arranged above the turntable 20, and the pickup arm 10 is pivotally supported at one end on this platform. The reproducing stylus 11 carried at the other, free end of the pickup arm 10 extends downwardly through a slot 26 in the platform 25 to engage in the spiral groove in the record 12 on the turntable 20. The slot 26 in the platform 25 extends substantially radially of the turntable 20 to provide a path for the stylus carrying end of the pickup arm 10 as the stylus 11 follows the record groove during rotation of the turntable.

Arranged further above the platform 25 is the intermediate vibrator 13 which in one form of construction is substantially Y-shaped when seen in a plan view, comprising a relatively wide stem extending along the slot 26 in the platform 25 and a pair of divergent branches each pivotally supported as by an upright pin 27 mounted on the platform 25. The stem of the intermediate vibrator 13 rests on a boss 28 formed on the pickup arm 10. The intermediate vibrator 13 is designed to receive mechanical vibrations from the pickup arm 10 during playback, by being held in sliding contact with its boss 28 throughout the course of travel of the pickup arm from a predetermined starting to terminal position on the record 12.

The diaphragm 16 is shown to be conical or, more precisely, frustoconical in shape and is rigidly supported directly by the casing 17, although it is quite possible to support the diaphragm by some stationary part other than the casing. The diaphragm 16 has a reinforced bottom 29 for receiving mechanical vibrations.

The phonograph construction of FIG. 2 as so far described is conventional. For further details concerning the intermediate vibrator 13 and so forth, reference may be had, for example, to my aforementioned U.S. Pat. Nos. 3,589,735 and 3,773,331.

In accordance with this invention, the lever 15 is pivotally supported by a fulcrum 30 on the intermediate vibrator 13. In this particular embodiment the lever 15 is substantially V-shaped when seen in a side view as in the drawing and is fulcrumed at its apex. This lever may therefore be considered to be constituted of two angled arms 31 and 32 on opposite sides of the fulcrum 30. The arm 31 has its distal end disposed under the reinforced bottom 29 of the diaphragm 16.

For exertion of a constant force, designated F in FIG. 1, on the distal end of the other arm 32, there is employed in this particular embodiment a leaf spring 33 which has one of its ends fastened as by a screw 34 to a column 35 or like stationary part of the phonograph. The other end of this leaf spring rests against the distal end of the arm 32 for application of the constant force F thereto.

The distal end of the arm 31 is therefore urged against the reinforced bottom 29 of the diaphragm 16 with the force $f$, FIG. 1, the magnitude of which is variable in accordance with the ratio of the lever arms $a/b$, as will be apparent from Equation (1) or (4). In the illustrated embodiment the arm 31 is shown to be slightly longer than the arm 32, but the two arms of the lever 15 can be made equal in length, as mentioned previously.

Also as set forth above in connection with FIG. 1, the lever 15 exerts on the intermediate vibrator 13 the force P which is the sum of the forces F and $f$ (see Equation (a)). This force P is approximately equal to the force (stylus pressure P') urging the stylus 11 against the record 12 on the turntable 20. From Equation (3), the stylus pressure P' is significantly in excess of the force $f$ exerted by the lever 15 on the reinforced bottom 29 of the diaphragm 16, particularly when the arm 31 of the lever is greater than, or equal to, the other arm 32 in length.

In operation, as the drive motor M is switched on, the rotation of its output shaft 24 is transmitted to the turntable 20 via the endless belt 23. With the turntable 20 thus set in rotation with the record 12 mounted thereon, the reproducing stylus 11, which is assumed to have been engaged in the spiral groove in the record in its starting position, follows the record groove for reproduction of intelligence recorded therein.

The mechanical vibrations set up in the stylus 11 in accordance with the undulations in the record groove are transmitted to the diaphragm 16 via the pickup arm 10 with its boss 28, the intermediate vibrator 13, and the lever 15. The diaphragm 16 converts these mechanical vibrations into audible sound waves. The sound thus reproduced will be of pleasing tone since the diaphragm 16 is prevented from emphasizing the treble frequencies in the sound by the lever 15.

As a further advantage of this invention, neither the stylus 11 nor the diaphragm 16 will be damaged upon displacement of the diaphragm or the record 12 on the turntable 20 toward each other, due for example to the undulations of the turntable or of the record itself, or to the deformation of the casing caused by external force. Such relative displacement of the diaphragm and the record toward each other can be absorbed by the lever 15 as same pivots about its fulcrum 30.

It is to be understood that this invention is not to be limited to the exact details of the embodiment disclosed herein since it is intended to be illustrative of the principles of the invention. The concepts and principles of the invention may be embodied in other forms and adapted for phonographs of other than the illustrated kind but of comparable character. The invention is therefore to be accorded the full scope of the claims appended hereto.

What I claim is:

1. In a phonograph of the type comprising:
    a casing;
    a turntable rotatable with a record mounted thereon;
    a pivotally mounted pickup arm carrying a reproducing stylus adapted to follow a groove in said record during rotation of said turntable for receiving mechanical vibrations therefrom;
    a diaphragm rigidly supported by a portion of said casing;
    an intermediate vibrator provided with means for mounting same to said casing in a cantilever fashion between said pickup arm and said diaphragm, said intermediate vibrator being adapted to remain in sliding contact with said pickup arm throughout the course of its travel from a predetermined starting to a terminal position on said record for receiving therethrough the mechanical vibrations set up in said reproducing stylus;
    the improvement comprising:
    a lever pivotally supported at a point intermediate both ends of said lever by mounting means provided on said intermediate vibrator, said lever having one end thereof disposed opposite to said diaphragm; and
    means for applying a constant force to the other end of said lever for urging said one end thereof against said diaphragm, whereby the mechanical vibrations received by said intermediate vibrator are transmitted through said lever to said diaphragm to cause said diaphragm to produce corresponding sound waves.

2. The improvement of claim 1, wherein the distance between said one end and said intermediate point of said lever is at least equal to the distance between said other end and said intermediate point of said lever.

3. The improvement of claim 1, wherein said lever is V-shaped and is pivotally supported at its apex.

4. The inprovement of claim 1, wherein:
    said means for applying a constant force is a spring, said spring having one end thereof secured to said casing and the other end thereof resting against said other end of said lever.

* * * * *